United States Patent
Yamamura et al.

[11] Patent Number: 5,563,575
[45] Date of Patent: Oct. 8, 1996

[54] SEISMIC ALARM DEVICE FOR VEHICLES

[75] Inventors: Takehiko Yamamura; Satoru Kobayashi; Kazukiyo Aoyama, all of Odawara, Japan

[73] Assignee: Yukosha Co., Ltd., Kanagawa, Japan

[21] Appl. No.: 275,751

[22] Filed: Jul. 19, 1994

[30] Foreign Application Priority Data

Jul. 21, 1993 [JP] Japan .................. 5-180197
Dec. 2, 1993 [JP] Japan .................. 5-302528

[51] Int. Cl.⁶ .................................. B60R 25/10
[52] U.S. Cl. ............... 340/429; 340/658; 340/665; 340/690; 200/61.45 R; 73/510
[58] Field of Search ................. 340/467, 690, 340/566, 429, 658, 665, 568, 429; 73/488, 495, 500, 510; 200/61.45 R, 61.52, 52 A

[56] References Cited

U.S. PATENT DOCUMENTS

| | | | |
|---|---|---|---|
| 3,543,261 | 11/1970 | Burney | 340/566 |
| 3,691,549 | 9/1972 | Wilson | 340/566 |
| 3,940,733 | 2/1976 | Johnson | 340/566 |
| 4,337,528 | 6/1982 | Clinard et al. | 340/566 |
| 4,358,750 | 11/1982 | Webster | 340/566 |
| 4,361,827 | 11/1982 | Geller | 340/566 |
| 4,797,661 | 1/1989 | Wiley | 340/664 |
| 5,047,995 | 9/1991 | Wells | 340/566 |

FOREIGN PATENT DOCUMENTS

| | | |
|---|---|---|
| 2555950 | 12/1983 | France . |
| 5180197 | 7/1993 | Japan . |
| 5302528 | 12/1993 | Japan . |

*Primary Examiner*—Jeffery Hofsass
*Assistant Examiner*—Van T. Trieu
*Attorney, Agent, or Firm*—Lowe, Price, LeBlanc & Becker

[57] ABSTRACT

A seismic alarm device for vehicles which is capable of detecting an earthquake while the vehicle is moving and gives the alarm upon occurrence of the earthquake in order to provide the safety such as by stopping the motor vehicle, wherein a plurality of acceleration detectors are mounted on the front and rear of the vehicle or on the left and right sides of the vehicle, output signals generated from these acceleration detectors are fed to a determination circuit, which determination circuit is arranged to measure an amplitude and period of the output signals and to compare phases of the output signals, then to output an alarm signal if the amplitude of the output signals is larger than a predetermined value while their periods are within a predetermined range and no phase difference exists between the output signals of the acceleration detectors, and an alarm circuit gives the alarm when the determination circuit outputs the alarm signal.

24 Claims, 4 Drawing Sheets

SEISMIC ALARM DEVICE FOR VEHICLES

BACKGROUND OF THE INVENTION

1. Field of the Invention

The present invention relates to a seismic alarm device for vehicles in which an alarm signal is generated when an earthquake is detected based on output signals from acceleration detector elements which are mounted at various points on a vehicle.

2. Description of the Prior Art

Conventionally, a device for detecting an earthquake and generating an alarm signal has been employed in various fields. For example, there is a device in which an acceleration detector element employing a pendulum or consisting of a piezoelectric element or strain gage is mounted on a stationary object, and an alarm signal is generated when such element vibrates at a value higher than a predetermined vibration value or outputs a signal which exceeds a predetermined value.

However, all such are mounted on a stationary object, and there has been no example where they are mounted on a moving object such as a vehicle which is subject to various types of pitching according to conditions of the road surface on which it is moving.

There have been considerable vehicle accidents causing from damages of roads due to a huge earthquake. If a device were able to generate an alarm signal as soon as an earthquake occurs, such vehicle accidents could have been prevented from causing by stopping the vehicle with a seismic alarm device.

It is therefore an object of this invention to provide a vehicle-mounted seismic alarm device for vehicles being capable of detecting a difference between the jolts of the vehicle caused by an earthquake and those by vehicle movement, and generating an alarm signal in case of the earthquake.

SUMMARY OF THE INVENTION

A seismic alarm device for vehicles according to the this invention comprises a plurality of acceleration detector elements mounted at various points on a vehicle; a determination means for outputting an alarm signal by receiving output signals from these acceleration detector elements when it is detected that, wherein measuring an amplitude and period of each output signal, comparing phases of output signals generated from the acceleration detector elements mounted on the front and rear of the vehicle or on the left and right sides of the vehicle, and when the amplitude of the output signal is detected larger than a predetermined value while the period is within a predetermined range and no phase difference exists between output signals from the acceleration detector elements mounted on the front and rear sides or on the left and right sides; and an alarm means which receives an output of the determination means for giving the alarm.

Furthermore, a seismic alarm device for vehicles according to the present invention comprises a plurality of acceleration detector elements mounted at various points on a vehicle; a determination means for outputting an alarm signal by receiving output signals from these acceleration detector elements, wherein comparing amplitudes and phases of output signals from the acceleration detector elements, and when no phase difference is detected between output signals and two or more output signals which exceed a predetermined value are received within a prescribed unit of time, the two or more output signals are converted into one signal for every unit of time, and the converted signals reaches to a predetermined number within a predetermined period of time; and an alarm means which gives the alarm upon receipt of an alarm signal when the determination means outputs the alarm signal.

According to the present invention, whenever the seismic alarm device for vehicles is turned on, output signals are constantly fed from the acceleration detector elements mounted at various points on the vehicle to the determination means. The determination means measures amplitudes and periods of the output signals fed from the acceleration detector elements, and compares the phases of output signals fed the acceleration detector elements mounted on the front and rear sides of the vehicle, or the left and right sides thereof.

When a tire of a motor vehicle runs onto a irregular surface of the road in driving, the body is twisted or rolled so that various signals are fed to the determination means from the acceleration detector elements. When the output signals fed from the front and rear or left and right acceleration detector elements are compared in phase, and if there were a phase difference between them, no alarm signal is generated by the determination means even if the output signals from the acceleration detector elements have larger amplitudes than a predetermined value and are within a range of predetermined period.

If there is an earthquake while the vehicle is moving, the body of the vehicle is pitched, as a whole, in case of a longitudinal wave, and the acceleration detector elements mounted on the front and rear positions of the vehicle supply output signals having the same phase to the determination means. The determination means then outputs an alarm signal when it is determined that there is no phase difference between the output signals, the output signals are larger than the predetermined value and their periods are within a predetermined range.

When a seismic oscillation of the earthquake is a transverse wave, the body is rolled as a whole, and the acceleration detector elements mounted on the front and rear positions of the vehicle supply output signals having the same phase to the determination means. The determination means then outputs an alarm signal when it is determined that there is no phase difference between the output signals, the amplitudes of the signals are larger than the predetermined value and their periods are within a predetermined range.

In either case above, when the determination means outputs the alarm signal, the alarm device gives the alarm and informs the driver of the occurrence of the earthquake.

Furthermore, in another arrangement of this invention, if an earthquake should occur, acceleration detector elements supply output signals having the same phase to the determination means, the determination means compares the amplitudes and phase of the output signals fed from the acceleration detector elements, and, if there is no phase difference and two or more output signals having amplitudes which are higher than a predetermined value are received within a unit of time, the output signals are converted into one signal for every unit of time and, further, if there is a predetermined number of converted signals within a predetermined period of time, outputs an alarm signal. Upon receipt of this alarm signal, the warning means generates an alarm.

DETAILED DESCRIPTION OF THE PREFERRED EMBODIMENTS

Figure 1:
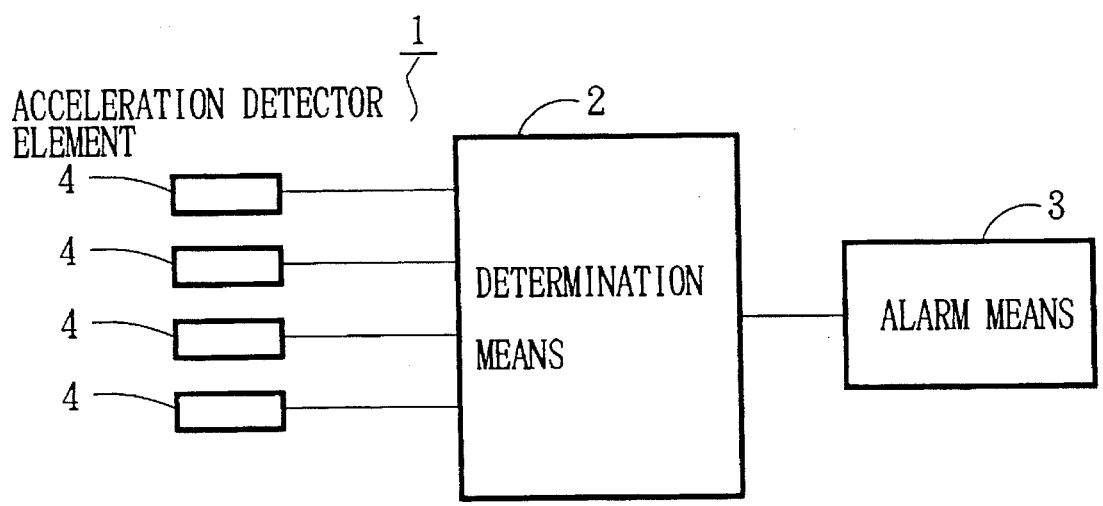
FIG. 1 is a circuit block diagram showing an embodiment of the present invention.

A seismic alarm device for vehicles embodying the present invention will be explained by referring to the drawings.

Now referring to FIG. 1, there is shown a block diagram seismic alarm device for vehicles of the first embodiment of this invention.

As seen from the FIG. 1, the seismic alarm device for vehicles 1 comprises a determination means 2, an alarm means 3, and four acceleration detector elements 4.

The acceleration detector element used is an AN type acceleration sensor AN 101 F available from Fuji Ceramics Co., Ltd., however any one of sensors such as AN 101, CR-02 BM, CR-03, CR-03 H, CR-035 H, or CH-035 BM may be used.

Figure 2A:
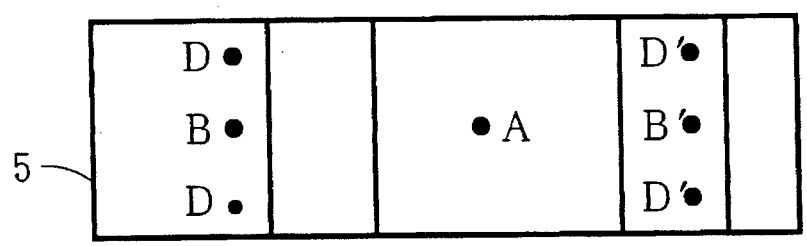
FIGS. 2A and 2B are a plan view and side view showing potions mounted with acceleration detector elements.
Figure 2B:
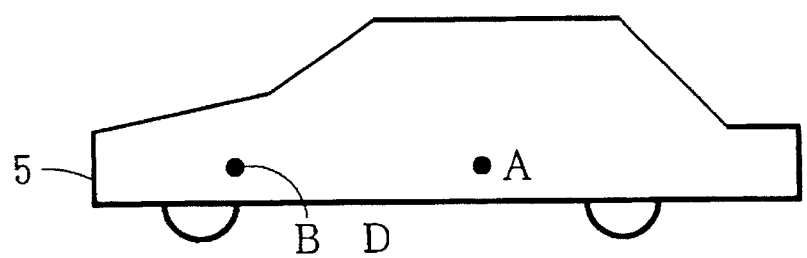

The acceleration detector elements 4 are positioned, as shown in FIG. 2, one at the center (point B) and one at each side (point D) of the engine compartment of the motor vehicle 5, and the other at the center (point A) of the motor vehicle. The points A and B are the positions where are comparatively low in pitch, and the points D are the positions at where a phase difference can be easily detected when the motor vehicle is moving.

The acceleration detector elements 4 are positioned at the points A, B and D above, however, they can also be positioned at other points if there are mounting spaces in the motor vehicle since it is desirable for the acceleration detector elements 4 to apart as much as possible from each other in order to make a phase difference larger, and to position at points where are low in pitch so as to eliminate undesirable noises from output signals.

Moreover, the acceleration detector elements 4 are mounted at four positions in this embodiment, however, they can be mounted at two or may be more than four positions.

In case of mounting a large number of acceleration detector elements, it is preferable to mount them in such order that (1) point A, the center of gravity of the motor vehicle, (2) point B, the center of the axle of the wheels, (3) point D, above the wheels, and points of symmetry D', B' centering the point A, and points on lines connecting B–B', D-D, and D'—D'.

The acceleration detector elements 4 may be secured by utilizing tightening bands, screws, bonding agent, or double-coated adhesive tape depending on where they are mounted.

The determination means 2 of the alarm device 1 comprised of a conventional analog amplifier, a logic circuit and the like, or a microcomputer, measures amplitudes and periods of output signals fed from the acceleration detector elements 4 and compares phases of output signals fed from the acceleration detector elements 4 mounted at the front and rear, or at both sides.

Then, it is arranged to output an alarm signal if an amplitude of output signals is larger than a predetermined value while their periods are within a predetermined range, and there is no phase difference between the output signals fed from the acceleration detector elements at the front and rear, or at the left and right sides.

Figure 3:
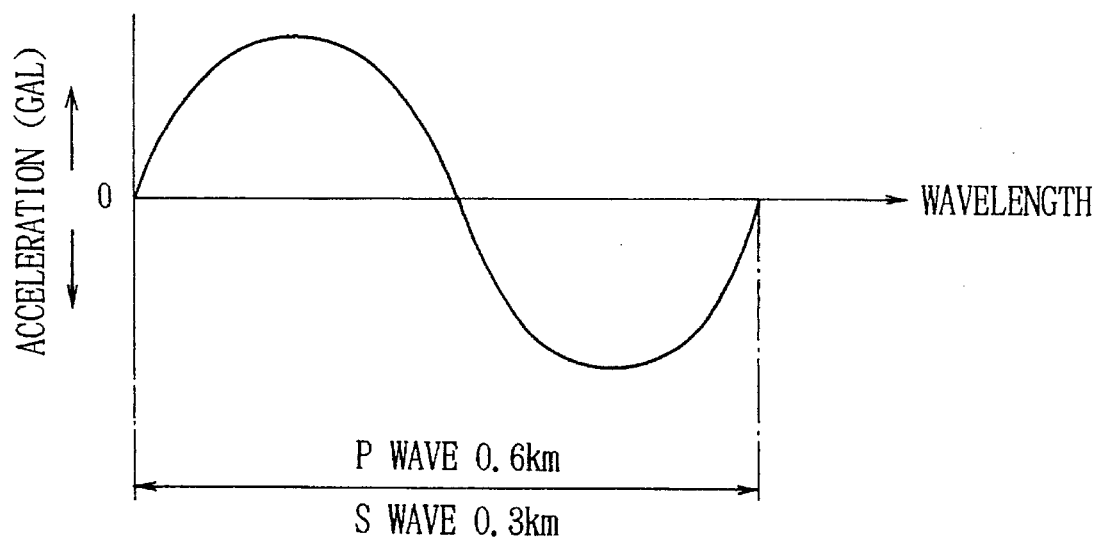
FIG. 3 is a wavelength of an earthquake.

An earthquake wave consists of a longitudinal wave (P wave) and a transverse wave (S wave). The speed of the longitudinal wave is usually around 6 km/sec on the ground surface although it depends on a depth of a hypocenter, and that of the transverse wave is approximately 3 km/sec. When the seismic wavelength is measured under the assumption that the frequency is 10 Hz, as shown in FIG. 3, the longitudinal wave has a wave-length of 0.6 km, while the transverse wave has a wavelength of 0.3 km.

Figure 4:
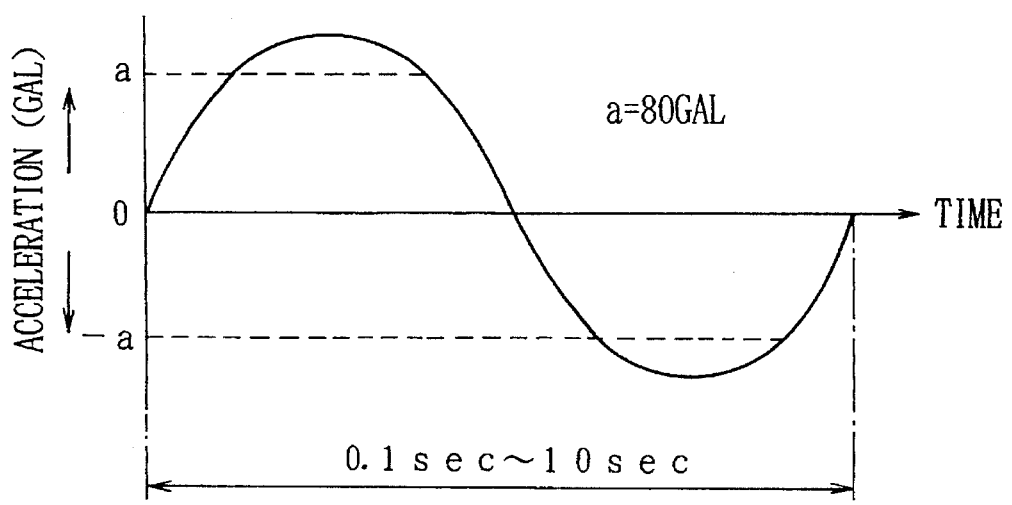
FIG. 4 is a period of an earthquake wave.

The longitudinal and transverse waves may vary in their period, but, as shown in FIG. 4, it is usually 0.1 sec–10 sec. An acceleration (unit: Gal) of the seismic wave varies significantly depending on the scale of the earthquake, but the value employed in the alarm device of the present invention is determined in such a manner as taking the influence of the earthquake on the road surface into consideration.

Firstly, a predetermined period may be freely determined within a range of 0.1 sec–10 sec. For example, it is determined to be 0.2 sec–1.5 sec. Secondly, a predetermined value a is ±80 Gal which is selected to be larger than a predetermined value of the anticipated earthquake. This value corresponds to a magnitude of 4–5.

Moreover, the alarm means 3 of this alarm device is arranged to give the alarm upon receipt of the alarm signal from the determination means 2, the circuit of which comprises transistors, ICs and the like. The alarm may be given by a flashing light, a buzzer, a sound, or a combination thereof.

Whenever the alarm device 1 is turned on, the output signals are constantly fed from the acceleration detector elements 4, which are mounted at various points on the motor vehicle, to the determination means 2. The determination means 2 measures the amplitude and period of the output signals fed from the acceleration detectors 4, and compares phases of the output signals of the acceleration detectors 4 mounted on the front and rear of the vehicle, or on the left and right sides.

When a tire encounters with irregular surface of the road while the motor vehicle is moving and the body is twisted or pitched, various kinds of signals are fed to the determination means 2 from the acceleration detector elements 4. Since there is a phase difference between the output signals of the acceleration detector elements 4 mounted at the front and rear, or the left and right, when they are compared in phase, the determination means 2 does not output the alarm signal even if there is the output signals of the acceleration detector elements 4 having an acceleration which is larger than ±80 Gal and the period which is within a predetermined range of 0.2 sec–1.5 sec.

If an earthquake occurs while the motor vehicle is moving, the body is, as a whole, is pitched in case of a longitudinal wave, and the acceleration detector elements 4 mounted on the front and rear positions of the vehicle supply output signals in the same phase to the determination means 2. The determination means 2 then outputs an alarm signal when it is determined that there is no phase difference, and the acceleration of the signals is larger than ±80 Gal and their cycles are within 0.2 sec–1.5 sec.

When the seismic oscillation of an earthquake is a transverse wave, the body, is rolled as a whole, and the acceleration detector elements 4 mounted on the front and rear positions of the motor vehicle supply output signals in the same phase to the determination means 2. The determination means 2 outputs an alarm signal when it is determined that there is no phase difference between the output signals and an acceleration is detected higher than ±80 Gal and their periods are within the range of 0.2 sec–1.5 sec.

Now, another embodiment of the present invention will be described. It should be noted that like reference numerals are used for the same or equivalent components as those illustrated in the previous embodiment.

This embodiment mainly differs from the previous embodiment in the determination means 2, which functions, instead of measuring the period of the output signals from the acceleration detector elements, as hereinafter described.

That is, if there is no phase difference between the output signals of the acceleration detector elements and two or more output signals which is higher than a predetermined value are fed to the determination means within a unit of time, the determination means converts the received signals into one signal for every unit of time and, if derived are a predetermined number of converted signals within a predetermined period of time, the determination means outputs an alarm signal.

Figure 5:
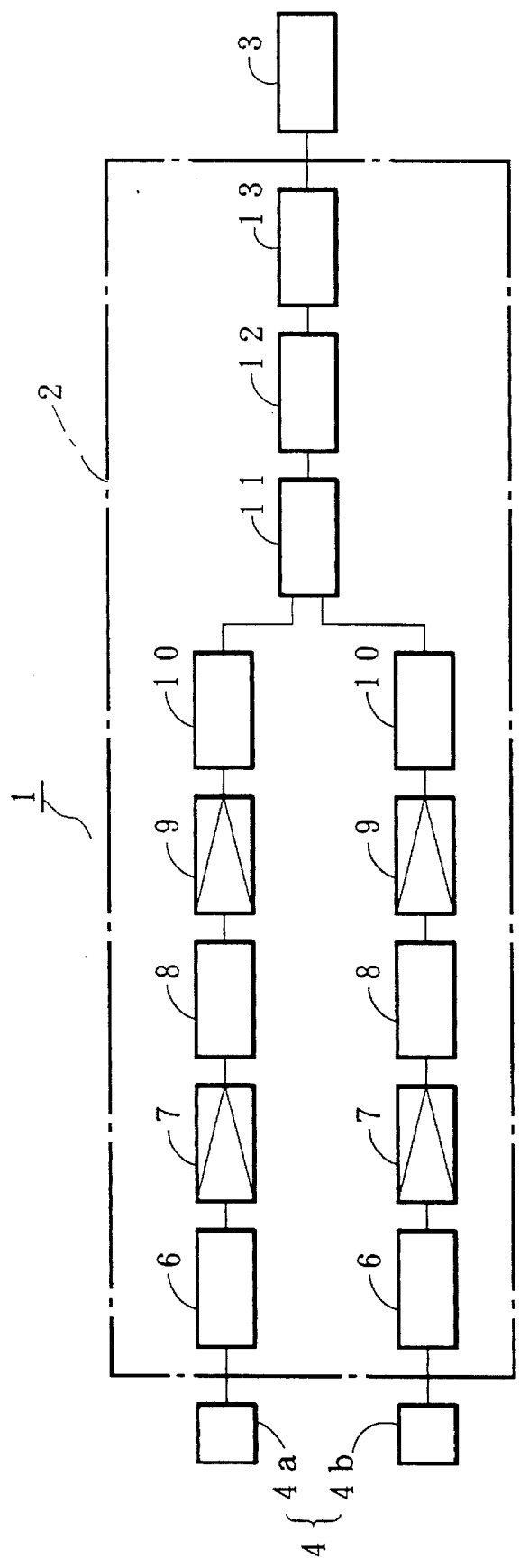
FIG. 5 is a circuit block diagram showing another embodiment of the present invention.

The detailed circuit diagram of the determination means 2 is shown in FIG. 5.

In this embodiment, two acceleration detector elements 4 are used, one element is used for an acceleration detector element 4a for triggering, another element is used for an acceleration detector element 4b for detecting phase.

Figure 6:
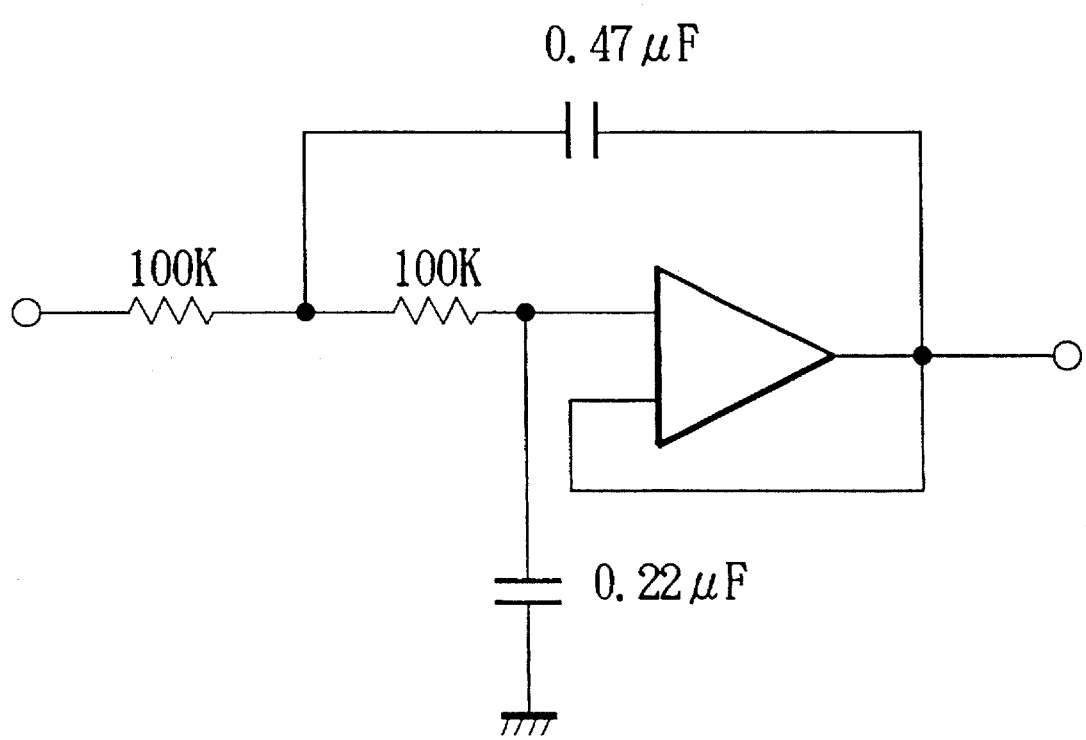
FIG. 6 is an example of a low-pass filter.

In FIG. 5, element 6 denotes a low-pass filter to pass frequencies at less than 10 Hz or less, element 7 denotes a wideband amplifier for amplifying frequencies from direct current to several hundred Hz, element 8 denotes a low-pass filter to pass frequencies at or less than 5 Hz, whereby two filters enhance filtering effects together with the low-pass filter 6, the detailed circuit of which is shown in FIG. 6. Element 9 denotes a low-frequency amplifier for amplifying frequencies from direct current to about 10 Hz, and for adjusting the input level to the next stage.

Element 10 denotes a level detector which is a provided for generating an output upon receipt of an input which is larger than a predetermined value. A threshold value of the level detector 10 is equal to an output value of the low-frequency amplifier 9 at the time when an acceleration to the acceleration detector elements 4a and 4b is detected as 80 Gal.

Element 11 denotes an AND circuit.

Element 12 denotes a counter circuit A which is arranged such that, after an acceleration being detected by the acceleration detector element 4a and a phase difference with an output of the acceleration detector element 4b being discriminated by the AND circuit 11, one signal is outputted when two signals, each of which is generated upon detection of the same phase at the AND circuit, are counted within one second.

In this case, however, only one signal is generated even if two or more signals are registered within one second. The start of one second is commenced when a trigger is detected.

Element 13 denotes a counter circuit B which has the same characteristics as that of the counter circuit A, but is arranged to output an alarm signal when it counts a certain number of signals in a certain period of time. For example, it is set to count five signals within five seconds or ten signals in ten seconds. This is because to distinguish the continuity of an earthquake from common vibration.

The determination means 2 is arranged such that the output signals fed from the acceleration detector elements 4 are amplified by the wideband amplifier 7, the amplified signals are then passed through the low-pass filters 6 and 8 for eliminating a noise, outputs of the filters then amplified by the low-frequency amplifier 9, hence an amplitude of the acceleration is measured. The phase difference in the output signals fed from the acceleration detector elements 4 which are mounted on the front and rear, or the left and right sides of the motor vehicle is compared by utilizing the AND circuit 11. Noises contained in the output of the AND circuit 11 is removed by the counter circuits A 12 and B 13 for detecting a real earthquake.

It is not shown in the drawings, however, both the first and second embodiments are arranged to stop the operation of the determination means 2 when the acceleration exceeds 400 Gal at the acceleration detector elements 4. This arrangement is to prevent erroneous operation of the determination means which may be caused at the time when a wheel drops into a deep depression on a unpaved road, since the acceleration applied on the acceleration detector element 4 may exceed 400 Gal and, under such condition, a value of an output signal of the acceleration detector element 4 increases considerably. Thus, an input level to the level detector 10 exceeds far beyond its threshold value and thereby causing an area wherein the detected signal of each acceleration detector element 4 falls into the same phase.

In addition to the above, if the acceleration is as high as 400 Gal, the driver recognizes occurrence of an earthquake without the seismic alarm device when driving on a normal road. Therefore, there arises no problem even if the operation of the alarm device 1 is stopped. An earthquake providing the acceleration of 400 Gal corresponds to a magnitude of about 7.

As described above, the present invention can distinguish the pitch of a vehicle causing from an earthquake even if the motor vehicle is moving, and generates an alarm signal upon occurrence of an earthquake, so that safety can be assured by stopping the motor vehicle.

What is claimed is:

1. A seismic alarm device for vehicles comprising:

a plurality of acceleration detector elements mounted at various points on a vehicle;

determination means which receives output signals from the plurality of the acceleration detector elements to measure amplitudes and periods of the output signals and to compare phases of output signals fed from the plurality of the acceleration detector elements mounted on the front and rear portions of the vehicle, or on the left and right sides of the vehicle; and a warning means which, when the determination means outputs an alarm signal, receives it and generates an alarm;

whereby said determination means outputs an alarm signal when the amplitudes of output signals are larger than a predetermined value while their periods are within a predetermined range and no phase difference exists between the output signals fed from the acceleration detector elements mounted on the front and rear, or on the left and right sides.

2. A seismic alarm device for vehicles comprising:

a plurality of acceleration detector elements mounted at various points on a vehicle;

a determination means which receives output signals from these acceleration detector elements to compare amplitudes of the output signals and phases of the output signals of the plurality of the acceleration detector elements; and a warning means which, when the determination means outputs an alarm signal, receives it and generates an alarm;

whereby, when no phase difference exist between the output signals and two or more output signals which are larger than a predetermined value are received within a unit of time, the output signals are converted into one signal for every unit of time, and an alarm signal is outputted when a predetermined number of converted signals exists within a predetermined period of time.

3. A seismic alarm system for vehicles comprising:

a first acceleration sensor disposed on a front or a right side of a vehicle for transmitting a first output signal having a first amplitude, a first period and a first phase, responsive to a vibration of said vehicle;

a second acceleration sensor disposed on a rear or a left side of the vehicle for transmitting a second output signal having a second amplitude, a second period and a second phase, responsive to said vibration;

an electrical device for determining if said first amplitude and said second amplitude exceed a threshold value, said first period and said second period are within a range, and the first phase and the second phase are the same; and an alarm device for issuing an alarm signal responsive to determination that said first amplitude and said second amplitude exceed said threshold value, said first period and said second period are within said range, and said first phase and said second phase are the same.

4. A system according to claim 3, wherein said second acceleration sensor is disposed on the rear of the vehicle if said first acceleration sensor is disposed on the front of the vehicle, or said second acceleration sensor is disposed on the left side of the vehicle if said first acceleration sensor is disposed on the right side of the vehicle.

5. A system according to claim 3, further comprising a third acceleration sensor disposed at a center of gravity of said vehicle for transmitting a third output signal having a third amplitude, a third period and a third phase, responsive to said vibration, and wherein:

said electrical device is adapted to determine if said third amplitude exceeds said threshold value, said third period is within said range, and the third phase is the same as said first phase and said second phase; and said alarm device is adapted to issue said alarm signal responsive to determination also that said third amplitude exceeds said threshold value, said third period is within said range, and said third phase is the same as said first phase and said second phase.

6. A system according to claim 3, wherein said first acceleration sensor is disposed on the front of the vehicle proximate to a front wheel axle and substantially equidistance between front wheels of said vehicle and said second acceleration sensor is disposed on the rear of the vehicle proximate to a rear wheel axle and substantially equidistance between rear wheels of said vehicle.

7. A system according to claim 3, wherein said first acceleration sensor is disposed on the right side of the vehicle above a right wheel of said vehicle and said second acceleration sensor is disposed on the left side of the vehicle above a left wheel of said vehicle.

8. A system according to claim 7, wherein said right and said left wheels are front wheels.

9. A system according to claim 3, wherein said threshold value is ±80 Gal and the beginning of said range is at least 0.1 seconds and the end of said range is 10 seconds or less.

10. A system according to claim 9, wherein said range is from 0.2 to 1.5 seconds.

11. A method for issuing a seismic alarm in vehicles comprising the steps of:

sensing a vehicle vibration at a front or a right side of a vehicle and transmitting a first output signal having a first amplitude, a first period and a first phase, responsive to said vibration;

sensing said vehicle vibration at a rear or a left side of the vehicle and transmitting a second output signal having a second amplitude, a second period and a second phase, responsive to said vibration;

determining if said first amplitude and said second amplitude exceed a threshold value, if said first period and said second period are within a range and if the first phase and the second phase are the same; and issuing an alarm signal responsive to determining that said first amplitude and said second amplitude exceed said threshold value, said first period and said second period are within said range, and said first phase and said second phase are the same.

12. A method according to claim 11, wherein said sensing is performed either at the front and the rear or at the right and the left sides of the vehicle.

13. A method according to claim 11, further comprising the steps of:

sensing said vehicle vibration at a center of gravity of said vehicle and transmitting a third output signal having a third amplitude, a third period and a third phase, responsive to said vibration; and determining if said third amplitude exceeds said threshold value, said third period is within said range, and the third phase is the same as said first phase and said second phase;

wherein said alarm signal issuance requires determination that said third amplitude exceeds said threshold value, said third period is within said range, and said third phase is the same as said first phase and said second phase.

14. A seismic alarm system for vehicles comprising:

a first acceleration sensor disposed on a front or a right side of a vehicle for transmitting a first output signal having a first amplitude and a first phase, responsive to a vibration of said vehicle;

a second acceleration sensor disposed on a rear or a left side of the vehicle for transmitting a second output signal having a second amplitude and a second phase, responsive to said vibration;

an electrical device for receiving said first and said second output signals and for determining if said first amplitude and said second amplitude exceed a threshold value, if the first phase and the second phase are the same, and if said first output signal and said second output signal are both received within a time period; and an alarm device for issuing an alarm signal responsive to determination that said first amplitude and said second amplitude exceed said threshold value, said first phase and said second phase are the same and said first output signal and said second output signal are both received within said time period.

15. A system according to claim 14, wherein said second acceleration sensor is disposed on the rear of the vehicle if said first acceleration sensor is disposed on the front of the vehicle or the second acceleration sensor is disposed on the left side of the vehicle if said first acceleration sensor is disposed on the right side of the vehicle.

16. A system according to claim 14, further comprising a third acceleration sensor disposed at a center of gravity of said vehicle for transmitting a third output signal having a third amplitude and a third phase, responsive to said vibration; wherein:

said electrical device is adapted to determine if said third amplitude exceeds said threshold value, the third phase is the same as said first phase and said second phase, and said third output signal is received within said time period; and said alarm device is adapted to issue said alarm signal responsive to determination also that said third amplitude exceeds said threshold value, said third phase is the same as said first phase and said second phase and said third output signal is received within said time period.

17. A system according to claim 14, wherein said first acceleration sensor is disposed on the front of the vehicle proximate to a front wheel axle and substantially equidistance between front wheels of said vehicle and said second acceleration sensor is disposed on the rear of the vehicle proximate to a rear wheel axle and substantially equidistance between rear wheels of said vehicle.

18. A system according to claim 14, wherein said first acceleration sensor is disposed on the right side of the vehicle above a right wheel of said vehicle and said second acceleration sensor is disposed on the left side of the vehicle above a left wheel of said vehicle.

19. A system according to claim 18, wherein said right and said left wheels are rear wheels.

20. A system according to claim 14, wherein said threshold value corresponds to ±80 Gal and said time period is approximately 1 second.

21. A method for issuing a seismic alarm in vehicles comprising the steps of:

sensing a vehicle vibration at a front or a right side of a vehicle and transmitting a first output signal having a first amplitude and a first phase, responsive to said vibration;

sensing said vehicle vibration at a rear or a left side of the vehicle and transmitting a second output signal having a second amplitude and a second phase, responsive to said vibration;

receiving said first and said second output signals;

determining if said first amplitude and said second amplitude exceed a threshold value, the first phase and the second phase are the same, and said first output signal and said second output signal are both received within a time period; and issuing an alarm signal responsive to determining that said first amplitude and said second amplitude exceed said threshold value, said first phase and said second phase are the same, and said first output signal and said second output signal are both received within said time period.

22. A method according to claim 21, wherein said sensing is performed either at the front and the rear or at the right and the left sides of the vehicle.

23. A method according to claim 21, further comprising the steps of:

sensing said vehicle vibration at a center of gravity of said vehicle and transmitting a third output signal having a third amplitude and a third phase, responsive to said vibration; and receiving said third output signal; and determining if said third amplitude exceeds said threshold value, the third phase is the same as said first phase and said second phase, and said third output signal is received within the time period;

wherein said alarm signal issuance requires determination that said third amplitude also exceeds said threshold value, said third phase is the same as said first phase and said second phase, and said third output signal is received within the time period.

24. A method according to claim 21, wherein said threshold value corresponds to ±80 Gal and said time period is approximately 1 second.

* * * * *